United States Patent
Jachner

(10) Patent No.: US 9,648,118 B1
(45) Date of Patent: May 9, 2017

(54) DISTRIBUTED INTELLIGENT RICH PRESENCE

(75) Inventor: Jack Jachner, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1750 days.

(21) Appl. No.: 11/382,266

(22) Filed: May 8, 2006

(51) Int. Cl.
G06F 15/16 (2006.01)
H04L 29/08 (2006.01)
H04L 12/58 (2006.01)

(52) U.S. Cl.
CPC .............. H04L 67/24 (2013.01); H04L 51/12 (2013.01); *H04L 12/585* (2013.01); *H04L 67/1093* (2013.01)

(58) Field of Classification Search
CPC  H04L 12/5815; H04L 29/08684; H04L 67/24
USPC ........................................................ 709/203
See application file for complete search history.

(56) References Cited

U.S. PATENT DOCUMENTS

| | | | |
|---|---|---|---|
| 2004/0122977 A1* | 6/2004 | Moran et al. ................. | 709/246 |
| 2004/0133640 A1* | 7/2004 | Yeager et al. ................ | 709/204 |
| 2004/0153506 A1* | 8/2004 | Ito et al. ....................... | 709/204 |
| 2006/0031772 A1* | 2/2006 | Valeski ......................... | 715/751 |
| 2006/0242237 A1* | 10/2006 | Manion et al. ................. | 709/204 |
| 2007/0067443 A1* | 3/2007 | Seligmann et al. .......... | 709/224 |
| 2007/0078968 A1* | 4/2007 | Kelley et al. ................. | 709/224 |
| 2008/0141111 A1* | 6/2008 | Morris .......................... | 715/230 |
| 2008/0148276 A1* | 6/2008 | Kerr et al. .................... | 719/313 |

* cited by examiner

*Primary Examiner* — Tom Y Chang
(74) *Attorney, Agent, or Firm* — RGIP LLC

(57) ABSTRACT

A system, method and computer readable medium for distributed intelligent rich presence comprising filtering presence information of at least one presence source at the at least one presence source, distributing the filtered presence information to at least one presence watcher, and aggregating the filtered presence information at the at least one presence watcher.

13 Claims, 4 Drawing Sheets

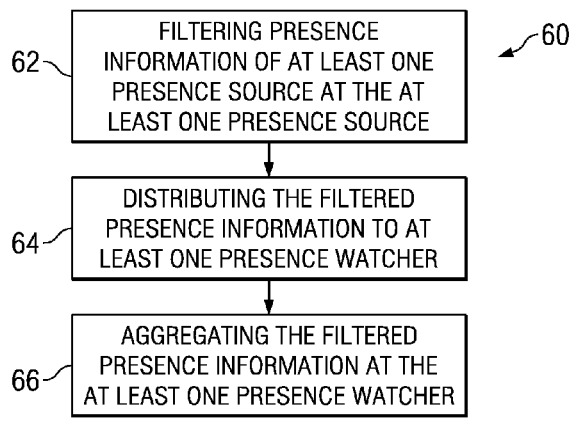
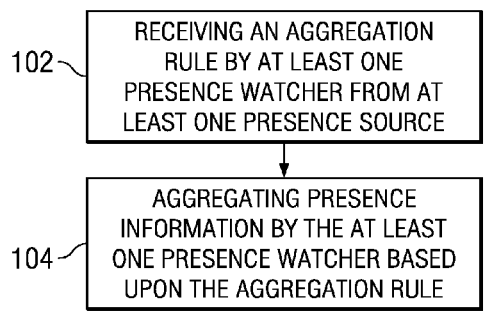
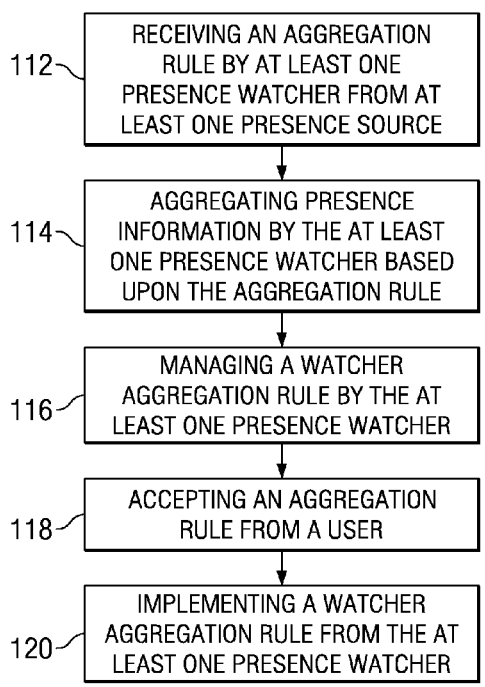

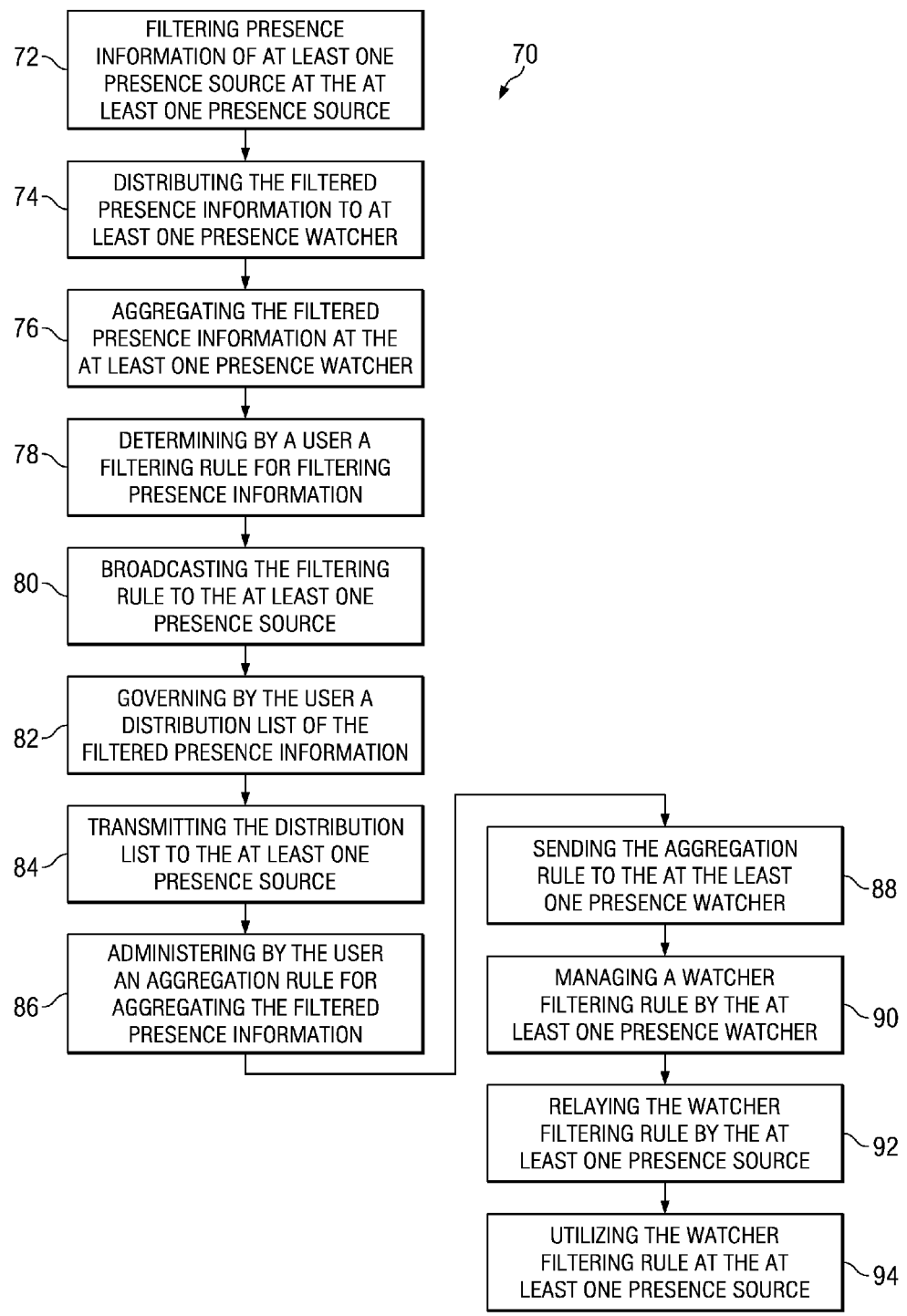

DISTRIBUTED INTELLIGENT RICH PRESENCE

BACKGROUND OF THE INVENTION

Presence is generally defined as knowing that a person is available via, for example, a certain device over a particular medium as soon as the user connects to a network. For instance, via presence information, it may be ascertained that the person is available online, and on a connected device with a certain device profile. Presence may be used to communicate the state information of a single person or a group of people or an individual entity or a group of entities. A user or entity which indicates its presence state is termed a presentity. A group of users or a group of entities which indicates a single aggregated presence state is termed as an aggregate or an aggregate presentity. Presence is used to notify a group of watchers in a contact list about the state of person, including availability. When the user changes its presence state, each contact on the contact list is informed about the new presence state of the user.

Previously presence was aggregated and filtered at a central processor, with the addition of users aggregation and filtering bottlenecks at the central processor. The present invention is for distributed aggregation and filtering to the presence sources and presence watchers, thus allowing greater ease in scaling.

Therefore, what is needed is a method of implementing presence aggregation and filtering without creating bottlenecks at the central processor. More specifically what is needed is a method to distribute to presence clients and connectors the functionality of rich presence aggregation and of the intelligent filtering of presence.

SUMMARY OF THE INVENTION

The present invention enhances the scalability of Intelligent Rich Presence (IRP) systems for large scale applications (e.g. operator deployments and managed communication systems). For these deployments, an IRP server may require a costly amount of processing to aggregate presence then filter for user preference, administrator policy and security for a large population of users and/or complex aggregation and filtering rules.

The present invention addresses user privacy concerns that arise due to storing in the presence server (out of the user's control) of rich presence information that may be sensitive and private to the user. Certain legislative or regulatory environments prohibit such information to be stored at the service provider without explicit user consent, making widespread deployment difficult.

The present invention is a method to distribute to presence clients and connectors the functionality of rich presence aggregation and of intelligent filtering of presence (i.e. different views for different watchers).

Presence systems distribute the presence state of presentities (presence entities) to subscribed users (watchers) for display on a presence client. These presentities are typically human users with presence states such as on-line, on-the-phone or out-to-lunch. A rich presence server aggregates presence information from multiple sources, such as phones, Instant Messaging (IM) applications, video applications, calendar applications, IMS networks, etc. Intelligent rich presence servers filter the information selectively for distribution to different watchers or groups of watchers, with filtering rules appropriate to user preferences on privacy, and administrator Policies and security considerations.

A typical architecture of an intelligent rich presence server, as deployed in the enterprise market would provide filtering and aggregation at an IRP server. The presence of a user, say Alice, is aggregated across multiple sources (IM client, calendar, Private Branch eXchange (PBX)) in the IRP engine, filtered for privacy, security and policy in the IRP engine and then distributed to watchers.

There are two problems when deploying IRP servers to Operator environments the first problem is scalability. A large number of users with complex aggregation and filtering rules require large and expensive computing infrastructure to implement the IRP servers. The second problem is privacy laws, in the centralized IRP server architecture, the IRP server stores the complete user presence in the server, and this information may be subject to lawful or un-lawful intercept.

These issues are less important in the enterprise, where scale is smaller and the employee already gives up expectation of privacy when using the enterprise communication and computation equipment.

The present invention implements aggregation and intelligent filtering rules distributed to presence sources (filtering and distribution to sub-sets of watchers), and to presence watchers (aggregation rules for the watched presentity).

The IRP functionality is distributed to the presence sources and presence watchers (not centralized at the presence server). IRP functionality is distributed at the sources in the following ways, filtering at the presence sources and distribution of different filtered information to different watchers or sets of watchers. Presence sources include presentity presence user Agents and connectors to presence information sources (calendar applications, telephony systems (PBX, IMS, etc), IM systems, collaboration servers, IMS infrastructure and clients). The presence subscription (distribution) lists and associated filtering rules are determined by the presentity and distributed to presence sources that are distributing information regarding the presentity. List updates are distributed to presence sources. Filtering rules updates are distributed to presence sources. Presence watchers may request specific watcher filtering rules to the presentity and its presence sources (e.g. for watcher bandwidth reduction).

IRP functionality is distributed at the watchers in the following ways, aggregation at presence watchers, using aggregation rules distributed by the presentity, where the aggregation rules are updated by the presentity. Watcher must store and implement presentity rules for each presentity or presentity set. Presence watchers may also implement their own watcher aggregation filters. Improved scalability, current implementation of IRP servers require a server every few thousand users, hard to scale to millions of users. Improved privacy, information is filtered at the presence source, rather than in a centralized location.

In one embodiment of the invention a method of assigning distributed intelligent rich presence in a presence system that comprises filtering presence information of at least one presence source at the at least one presence source, distributing the filtered presence information to at least one presence watcher, and aggregating the filtered presence information at the at least one presence watcher. The method may also include determining by a user a filtering rule for filtering presence information, broadcasting the filtering rule to the at least one presence source, governing by the user a distribution list of the filtered presence information, transmitting the distribution list to the at least one presence source, administering by the user an aggregation rule for aggregating the filtered presence information, sending the aggregation rule to the at the least one presence watcher, managing a watcher filtering rule by the at least one presence watcher, relaying the watcher filtering rule to the at least one presence source and utilizing the watcher filtering rule at the at least one presence watcher.

In another embodiment of the invention a computer readable medium that comprises instructions for, receiving an aggregation rule by at least one presence watcher from at least one presence source, and aggregating presence information by the at least one presence watcher based upon the aggregation rule. The computer readable medium may also comprise instructions for managing a watcher filtering rule by the at least one presence watcher, accepting an aggregation rule from a user and implementing a watcher aggregation rule for the at least one presence watcher.

In yet a further embodiment of the invention a distributed intelligent rich presence system including a presence server for collecting presence information from at least one presence source and distributing the presence information to at least one presence watcher that comprises, a presence source processor in communication with the presence server, wherein the presence source processor filters presence information of the at least one presence source, and a presence watcher processor in communication with the presence server, wherein the presence watcher processor aggregates filtered presence information by the at least one presence watcher. The system may also comprise a presence user processor in communication with the presence server, wherein the presence user processor broadcasts a filtering rule to the presence source processor, wherein the presence user processor transmits a distribution list to the presence source processor, wherein the presence user processor sends an aggregation rule to presence watcher processor, wherein a watcher filtering rule is relayed from the presence watcher processor to the presence source processor and wherein the filtered presence information is stored at the at least one presence source.

BRIEF DESCRIPTION OF THE DRAWINGS

FIG. 3 depicts a first method flow block of distributed intelligent rich presence in accordance with a preferred embodiment of the present invention;

FIG. 4 depicts a second method flow block of distributed intelligent rich presence in accordance with a preferred embodiment of the present invention;

FIG. 5 depicts a first software flow block of distributed intelligent rich presence in accordance with a preferred embodiment of the present invention; and FIG. 6 depicts a second software flow block of distributed intelligent rich presence in accordance with a preferred embodiment of the present invention.

DETAILED DESCRIPTION OF THE INVENTION

Figure 1:
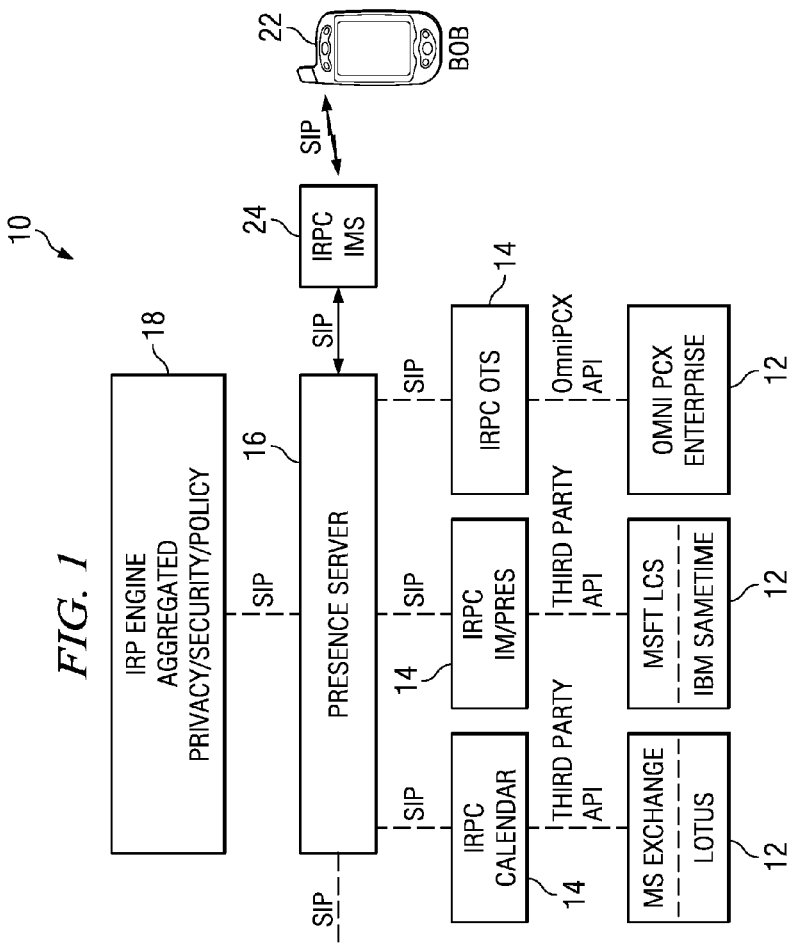
FIG. 1 depicts a server based intelligent rich presence system.
Figure 1:
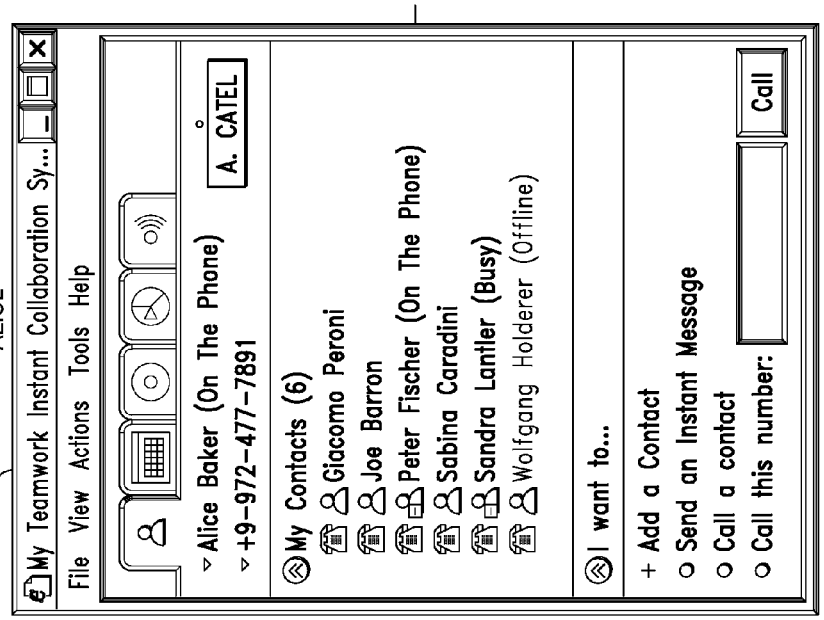

Referring now to FIG. 1, a server based intelligent rich presence system 10 is shown. A presence source 12 is in communication with an Intelligent Rich Presence Connector (IRPC) 14. The intelligent rich presence communication system communicates with a presence server 16. The presence server is in communication with the intelligent rich presence engine 18 which filters for presence sources and aggregates for presence watchers. A presence of a presence source 20 is communicated to the presence server. The presence watcher 22 communicates with an intelligence rich presence connector 24 which serves both sources and watchers. The intelligence rich presence connector communicates with the presence server. Each of the communications can occur by Session Initiation Protocol SIP.

Figure 2:
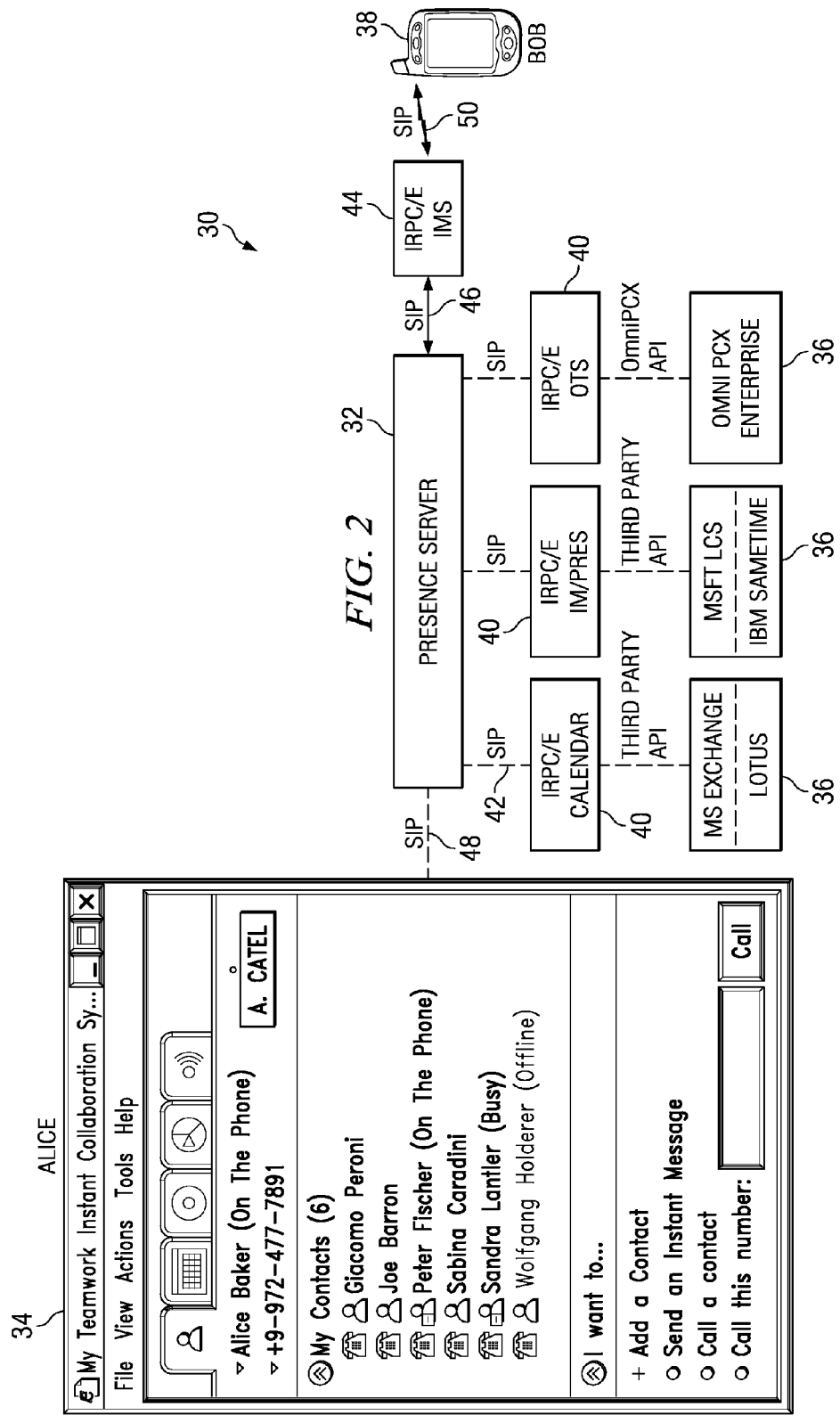
FIG. 2 depicts a distributed intelligent rich presence system in accordance with a preferred embodiment of the present invention.

Referring now to FIG. 2, a second distributed intelligent rich presence system 30 is shown. The distributed intelligent rich presence system includes a presence server 32 for collecting presence information from at least one presence source 34, 36 and distributing the presence information to at least one presence watcher 38. A presence source processor 40 which performs the function of the Intelligent Rich Presence Connector and Engine (IRPC/E), is in communication 42 with the presence server for filtering presence information of the at least one presence source. The communication may occur utilizing session initiation protocol. A presence watcher processor 44 which also performs the function of the IRP connector and engine, is in communication 46 with the presence server for aggregating filtered presence information for the at least one presence watcher. The communication may occur utilizing session initiation protocol. Presence source communication 48 and presence watcher communication 50 can occur utilizing session initiation protocol In this system the filtered presence information may be distributed to at least one presence watcher, the filtered presence information may be stored at the at least one presence source and the at least one presence source may include a device selected from the group consisting of a presence user agent and a connector. The blocks in this figure are performed by software, hardware, firmware, and/or the combination of software, hardware, and/or firmware. The transfer of information between each portion of the system occurs via at least one of the wireless protocol, the wired protocol and the combination of the wireless protocol and the wired protocol.

For example, the presence infrastructure may be accessed by the cellular phone or the computer with external wireless capability (such as the wireless card) or internal wireless capability (such as 802.11 or any of the other 802 variants), or by the Internet Protocol enabled phone. Other devices may also communicate with the presence infrastructure. These modules are software, hardware, firmware, and/or the combination of software, hardware, and/or firmware. The communications coupling occurs via at least one of the wireless protocol, the wired protocol and the combination of the wireless protocol and the wired protocol.

Referring now to FIG. 3, a first flow block of the method of distributed intelligent rich presence 60 is shown. The method for distributed intelligent rich presence, comprises filtering 62 presence information of at least one presence source at the at least one presence source, distributing 64 the filtered presence information to at least one presence watcher, and aggregating 66 the filtered presence information at the at least one presence watcher. For example, the presence infrastructure may be accessed by a cellular phone or a computer with external wireless capability (such as the wireless card) or internal wireless capability (such as 802.11 or any of the other 802 variants), or by an Internet Protocol enabled phone. Other devices may also communicate with the presence infrastructure. The steps performed in this figure are performed by software, hardware, firmware, and/or the combination of software, hardware, and/or firmware. The transfer of information between agents and clients occurs via at least one of a wireless protocol, a wired protocol and the combination of the wireless protocol and the wired protocol.

Referring now to FIG. 4, a second flow block of the method of distributed intelligent rich presence 70 is shown. The method for distributed intelligent rich presence, comprises filtering 72 presence information of at least one presence source at the at least one presence source, distributing 74 the filtered presence information to at least one presence watcher, and aggregating 76 the filtered presence information at the at least one presence watcher. The method may also include determining 78 by a user (presentity) a filtering rule for filtering presence information, broadcasting 80 the filtering rule to the at least one presence source, governing 82 by the user a distribution list of the filtered presence information, transmitting 84 the distribution list to the at least one presence source, administering 86 by the user an aggregation rule for aggregating the filtered presence information, sending 88 the aggregation rule to the at the least one presence watcher, managing 90 a watcher filtering rule by the at least one presence watcher, relaying 92 the watcher filtering rule to the at least one presence source and utilizing 94 the watcher filtering rule at the at least one presence source, wherein the at least one presence source includes a presence user agent and a connector. For example, the presence infrastructure may be accessed by a cellular phone or a computer with external wireless capability (such as the wireless card) or internal wireless capability (such as 802.11 or any of the other 802 variants), or by an Internet Protocol enabled phone. Other devices may also communicate with the presence infrastructure. The steps performed in this figure are performed by software, hardware, firmware, and/or the combination of software, hardware, and/or firmware. The transfer of information between agents and clients occurs via at least one of a wireless protocol, a wired protocol and the combination of the wireless protocol and the wired protocol.

Referring now to FIG. 5, a first software flow block of the method of distributed intelligent rich presence 100 is shown. A computer readable medium comprising instructions for receiving 102 an aggregation rule by at least one presence watcher from at least one presence source, and aggregating 104 presence information by the at least one presence watcher based upon the aggregation rule. The transfer of information of the information exchange state of the presence message occurs via at least one of the wireless protocol, the wired protocol and the combination of the wireless protocol and the wired protocol. These steps are performed by software but in other embodiments, may be performed by hardware, firmware, and/or the combination of software, hardware, and/or firmware without departing from the scope of the present invention.

Referring now to FIG. 6, a second software flow block of the method of distributed intelligent rich presence 110 is shown. A computer readable medium comprising instructions for receiving 112 an aggregation rule by at least one presence watcher from at least one presence source, and aggregating 114 presence information by the at least one presence watcher based upon the aggregation rule. The computer readable medium may also comprise instructions for managing 116 a watcher aggregation rule by the at least one presence watcher, accepting 118 an aggregation rule from a user and implementing 120 a watcher aggregation rule from the at least one presence watcher. The transfer of information of the information exchange state of the presence message occurs via at least one of the wireless protocol, the wired protocol and the combination of the wireless protocol and the wired protocol. These steps are performed by software but in other embodiments, may be performed by hardware, firmware, and/or the combination of software, hardware, and/or firmware without departing from the scope of the present invention.

The present invention includes a unique computer readable medium or software that is preferably stored on the presence server. In other embodiments, the software of the present invention can be stored on the presentity, the watcher or a combination of at least two of the presence server, the presentity, and the watcher. Such a computer readable medium comprises instructions for performing the functionality described in relation to FIGS. 1-6 and for assigning the presentity to the media session manager system.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the source processor, watcher processor and presence servers. Also, these capabilities may be performed in the current manner or in the distributed manner and on, or via, any device able to direct presence messages to targeted watchers. Further, although depicted in the particular manner, various blocks may be repositioned without departing from the scope of the current invention. For example, the source, watcher and presence server processors could be united into one processor. Still further, although depicted in the particular manner, the greater or lesser number of users, watchers and presence infrastructures could be utilized make the present invention more efficient.

What is claimed is:

1. A method of assigning distributed intelligent rich presence in a presence system comprising:
   determining a filtering rule for filtering presence information and an aggregation rule for aggregating filtered presence information;
   broadcasting the filtering rule to at least one presence source device;
   filtering the presence information of the at least one presence source device at the at least one presence source device;
   selectively distributing the filtered presence information to at least one presence watcher device not centralized at a presence server;
   receiving the aggregation rule at the presence watcher device; and
   aggregating the filtered presence information at the at least one presence watcher device by applying the aggregation rule.

2. The method of claim 1 comprising governing by a user a distribution list of the filtered presence information.

3. The method of claim 2 comprising transmitting the distribution list to the at least one presence source.

4. The method of claim 1 comprising sending the aggregation rule to the at the least one presence watcher.

5. The method of claim 1 comprising managing a watcher filtering rule by the at least one presence watcher.

6. The method of claim 5 comprising relaying the watcher filtering rule to the at least one presence source.

7. The method of claim 5 comprising utilizing the watcher filtering rule at the at least one presence source.

8. A non-transitory computer readable storage medium comprising instructions for:
  determining a filtering rule for filtering presence information and an aggregation rule for aggregating filtered presence information;
  broadcasting the filtering rule to at least one presence source device;
  filtering the presence information of the at least one presence source device at the at least one presence source device;
  receiving the aggregation rule at the presence watcher device; and
  aggregating the filtered presence information by the at least one presence watcher device, not centralized at a presence server, by applying the aggregation rule.

9. The non-transitory computer readable storage medium of claim 8 comprising instructions for managing a watcher filtering rule by the at least one presence watcher.

10. The non-transitory computer readable storage medium of claim 8 comprising instructions for implementing a watcher aggregation rule for the at least one presence watcher.

11. A distributed intelligent rich presence system including a presence server for collecting presence information from at least one presence source and distributing the presence information to at least one presence watcher comprising:

a presence source processor in communication with the presence server, wherein the presence source processor receives a broadcasted filtering rule and filters presence information of the at least one presence source;
  a presence user processor in communication with the presence server, wherein the presence user processor selects the filtering rule for filtering the presence information and an aggregating rule for aggregating filtered presence information and broadcasts the filtering rule to the presence source processor; and
  a presence watcher processor in communication with the presence server, wherein the presence watcher processor receives the aggregation rule and aggregates filtered presence information for the at least one presence watcher not centralized at the presence server by applying the aggregation rule.

12. The system of claim 11 comprising a presence user processor in communication with the presence server, wherein the presence user processor transmits a distribution list to the presence source processor.

13. The system of claim 11 wherein a watcher filtering rule is relayed from the presence watcher processor to the presence source processor.

* * * * *